United States Patent [19]

Yanagawa et al.

[11] Patent Number: 5,321,686
[45] Date of Patent: Jun. 14, 1994

[54] READ-WRITE HEAD OF AN MAGNETO-OPTICAL DISC PLAYER WITH BOTH HEADS MAGNETICALLY COUPLED TOGETHER

[75] Inventors: Naoharu Yanagawa; Shoji Taniguchi, both of Saitama, Japan

[73] Assignee: Pioneer Electronic Corporation, Tokyo, Japan

[21] Appl. No.: 952,006

[22] Filed: Sep. 24, 1992

[30] Foreign Application Priority Data

Feb. 27, 1992 [JP] Japan .................................. 4-76022

[51] Int. Cl.⁵ ...................... G11B 17/30; G11B 11/00
[52] U.S. Cl. ...................................... 369/219; 369/13; 360/59; 360/114
[58] Field of Search ................. 369/13, 219; 360/59, 360/114

[56] References Cited

U.S. PATENT DOCUMENTS

| | | | |
|---|---|---|---|
| 4,802,021 | 1/1989 | Makagawa et al. | 369/13 X |
| 5,093,816 | 3/1992 | Taniguchi et al. | 360/114 X |
| 5,200,935 | 4/1993 | Watanabe et al. | 369/13 |
| 5,202,863 | 4/1993 | Miyatake et al. | 369/13 |

FOREIGN PATENT DOCUMENTS

| | | | |
|---|---|---|---|
| 55746 | 3/1988 | Japan | 360/114 |
| 206937 | 8/1988 | Japan | 369/13 |
| 1-55536 | 6/1989 | Japan | 369/13 |

OTHER PUBLICATIONS

Patent Abstracts of Japan, vol. 12, No. 323 Sep. 2, 1988 & JP-A-63 086 130 (Toshiba Corp.) Apr. 16, 1988.

Primary Examiner—Edward K. Look
Assistant Examiner—John Ryznic
Attorney, Agent, or Firm—Nikaido Marmelstein Murray & Oram

[57] ABSTRACT

A read-write head of a magneto-optical disc player has an optical head having an optical pickup, and a magnetic head having an electromagnet. Each of the optical head and the magnetic head is slidably held by guide members so as to be moved in a radial direction of an optical disc. Permanent magnets are mounted on both heads for attracting each other head. Thus, when one of the head moves, the other follows.

2 Claims, 6 Drawing Sheets

READ-WRITE HEAD OF AN MAGNETO-OPTICAL DISC PLAYER WITH BOTH HEADS MAGNETICALLY COUPLED TOGETHER

BACKGROUND OF THE INVENTION

The present invention relates to a read-write head of an magneto-optical disc player, and more particularly to an improved head capable of quickly searching an area on an optical disc.

There are optical discs such as a CD including a read only CD and a writable CD-R disc which is used as a ROM. Further, as a writable optical disc having a high recording density, a write once disc and a magneto-optical disc are provided. Information is recorded on the disc and reproduced with a laser beam. These discs are different from the CD in the material of the recording surface.

For example, the write once disc has a tellurium or bismuth recording surface on which the lasers burn pits for recording. In another type of the write once disks, the lasers are focused on a recording surface coated with a selenium antimony ($Sb_2Se_3$) thin film, or an oxide tellurium (TeOx) thin film, or a thin film of organic pigment, changing the reflectivity of the light.

The magneto-optical disc uses as the recording surface, an amorphous alloy made of rare earth metals such as gallium, terbium, and others. In a magneto-optical recording method, the recording surface of the disc is initially magnetized to form a magnetic field in a direction perpendicular to the surface. The laser heats a predetermined area of the disc to elevate the temperature above Curie temperature, which is about 150° C., thereby reversing the direction of the magnetic field. To read the recorded information, the laser is irradiated on the recording surface so that polarized wave front slightly rotates as a result of the Kerr effect. Thus only the polarized wave deflected by the rotation is read by a photodetector, thereby enabling to read the information.

Referring to FIG. 9, a conventional read-write head for recording information on a magneto-optical disc 1 and reading the information therefrom has a magneto-optical pickup 2 disposed under the disc 1 and a magnetic head 3 disposed above the disc. The pickup 2 and the magnetic head 3 are connected with each other by way of a connecting member 4. The connecting member 4 maintains the relative position between the pickup 2 and the magnetic head 3 constant, so that an area on the disc subjected to a magnetic field of the magnetic head 3 coincides with an area subjected to a laser beam 5 from the pickup 2.

In order to record information on the disc 1, the read-write head is radially moved to an appropriate position of the disc 1. The laser beam 5 from the pickup 2 heats the surface of the disc 1 to Curie temperature. A magnetic field caused by the magnetic head dependent on the information which is to be recorded reverses the direction of the magnetic field on the disc. The information can be written in an area which is already written by modulating the direction of the magnetic field.

Since the magnetic head 3 and the pickup 2 are held together by the connecting member 4, the read-write head is relatively heavy. Hence the head cannot be quickly moved in a radial direction of the disc, which prevents a rapid search of an area on the disc.

Moreover, with the lapse of time, the pickup 2 and the magnetic head 3 may be displaced from each other due to a deformation of the connecting member 4. As a result, the reliability of the optical disc player reduces. In addition, since the connecting member 4 must have a large length in the radial direction of the disc, the player cannot be made much compact.

SUMMARY OF THE INVENTION

An object of the present invention is to provide a read-write head for a disc player which may be reduced in weight, thereby enabling quick search of a determined area on a disc.

According to the present invention there is provided read-write head of a magneto-optical disc player comprising an optical head having an optical pickup, and a magnetic head having an electromagnet. Each of the optical head and the magnetic head is slidably held by guide means so as to be moved in a radial direction of the disc, and attracting means is provided on one of the heads for attracting the other head.

Thus, when one of the head moves, the other follows.

In an aspect of the invention, the attracting means is a permanent magnet.

These and other objects and features of this invention will become understood from the following description with reference to the accompanying drawings.

DETAILED DESCRIPTION OF THE PREFERRED EMBODIMENTS

Figure 1:
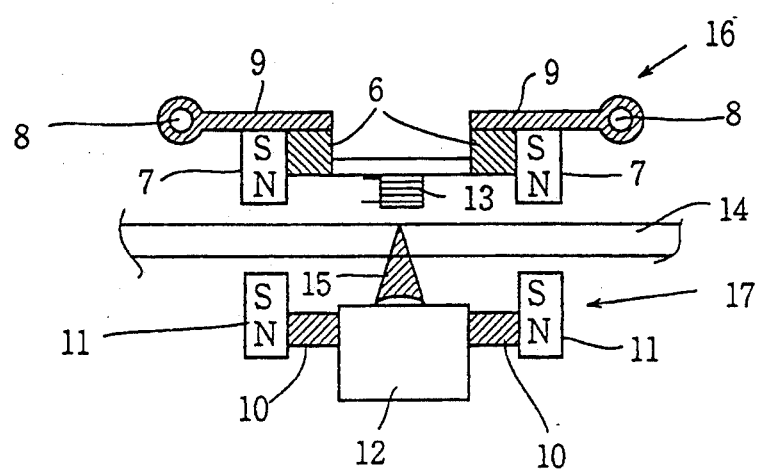
FIG. 1 is a sectional view of a read-write head of magneto-optical disc player according to the present invention.

Referring to FIG. 1, a read-write head according to the present invention comprises a magnetic head 16 and an optical head 17, positioned over and under a magneto-optical disc 14, respectively. The magnetic head 16 has a pair of support arms 9 each of which is slidably mounted on a guide rail 8 extending in a radial direction of the disc 14. A supporting member 6 is attached to the support arms 9, and an electromagnet 13 is mounted on the supporting member 6.

The optical head 17 has a supporting member 10 which is radially slidably mounted on a frame (not shown) and holds a magneto-optical pickup 12. The supporting member 10 is connected to a linear motor (not shown) so as to slide in the radial direction of the disc 14. The optical pickup 12 applies a semiconductor laser beam 15 to the disc 14.

Four permanent magnets 7 are squarely arranged and fixed on the outer sides of the supporting member 6.

Similarly four permanent magnets 11 are fixed on the supporting member 10 opposite the magnets 7. These magnets 7 and 11 are positioned so that when the magnet 7 accurately opposes the magnet 11, the laser beam 15 from the pickup 12 focuses within an area of the disc 14 where magnetic flux caused by the electromagnet 13 actuates.

Figure 2:
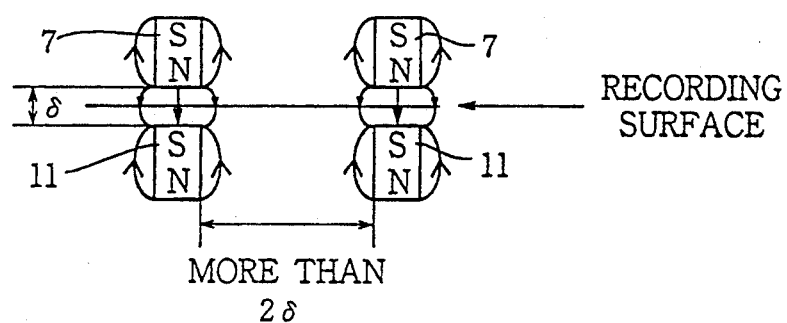
FIG. 2 is a schematic diagram showing an arrangement of magnets provided in the read-write head of FIG. 1.

Referring to FIG. 2, a distance between each pair of magnets 7 and magnets 11 is over 2δ where δ is a distance between the opposite magnets 7 and 11. According to a report, outwardly expanding distance of the magnetic flux from the edges of the opposite magnets is about the distance δ of the gap between magnets. Therefore, magnetic flux from the magnets 7 and 11 is prevented from attracting the recording of information.

Figure 3:
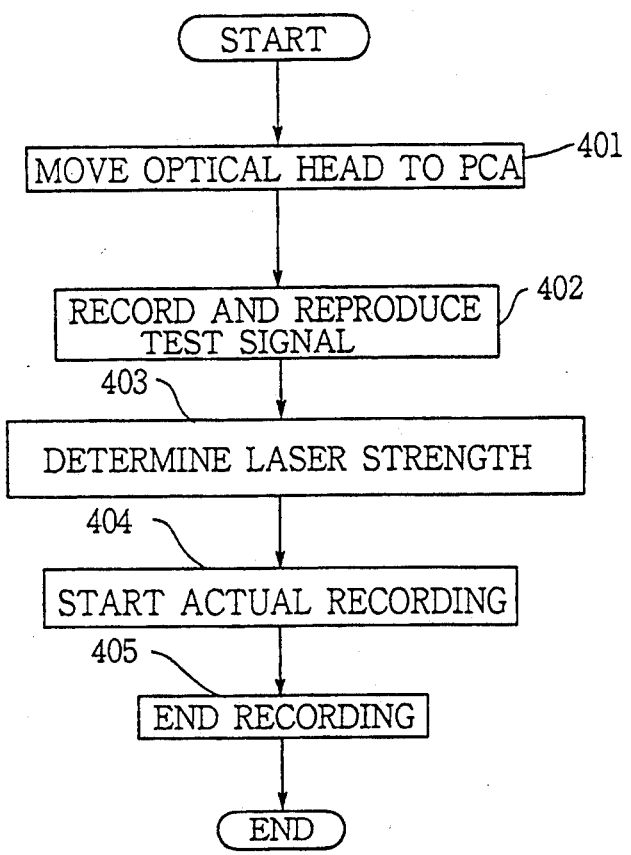
FIG. 3 is a flowchart for explaining the operation of the read-write head of FIG. 1.

The operation of the read-write head for recording information on the disc 14 is described hereinafter with reference to the flowchart of FIG. 3. At a step 401, the linear motor is driven to move the optical head 17 to a PCA (Power Calibration Area) which is the innermost of the disc.

When the optical head 17 moves, the magnets 7 which is attracted to magnets 11 causes the magnetic head 16 to slide accordingly along the guide rail 8. When the optical head 17 stops at the PCA, the magnetic head 16 also stops so as to oppose the magnets 7 against the magnet 11. Thus the magnetic flux can accurately cover the focus of the laser beam 15.

At a step 402, the optical pickup 12 generates the laser beam 15 to raise the temperature of the PCA to the Curie temperature. The magnetic flux caused by the electromagnet 13 reverses the direction of the magnetic field on the recording surface of the disc 14, thereby recording a test signal in the PCA. The test signal is reproduced by irradiating a laser beam 15 so as to measure the level of the reproduced signal. An appropriate strength of the semiconductor laser to be radiated from the pickup 12 is determined in accordance with the power of the reproduced signal at a step 403.

After the radiating strength of the laser beam 15 is determined, the optical head 17 is moved to a program area of the disc 14. The magnetic head 16 follows the optical head 17 so as to confront the electromagnet 13 with the optical pickup 12. Thereafter, the pickup 12 and the electromagnet 13 are actuated to write information on the disc 14 at steps 404 and 405 as hereinbefore described.

Thus in accordance with the present invention, the electromagnet 13 is moved together with the optical pickup 12 without the connecting member. Therefore, it is possible to reduce the weight and size of the optical pickup head.

In place of the magnets 7 and 11, annular magnets may be used, disposed around the electromagnet 13 and the pickup 12. The magnets 7 and 11 may further be electromagnets. The electromagnets are de-energized when reproducing information, thereby decreasing the load exerted on the optical pickup 12.

Figure 4:
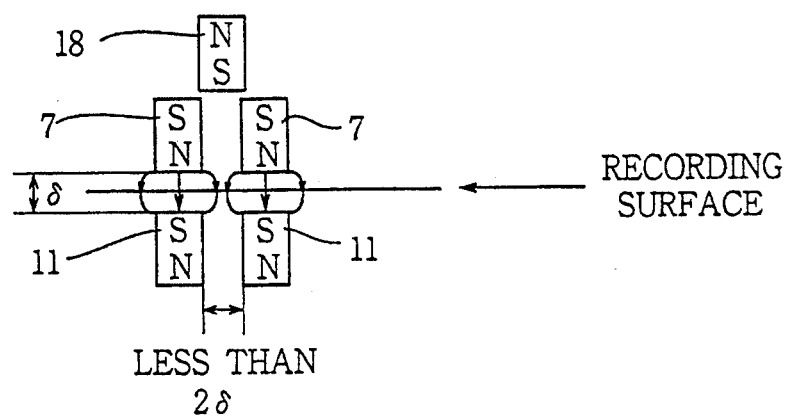
FIG. 4 is a schematic diagram showing another arrangement of the magnets provided in the read-write head.

FIG. 4 shows a modification of the present invention where a magnet 18 is provided between the magnets 7 to cancel a leakage magnetic flux of the magnets 7 and 11. Thus, the distances between each pair of magnets 7 and magnet 11 may be reduced to less than 2δ. As a result, the size of the optical disc player can be further reduced.

Figure 5:
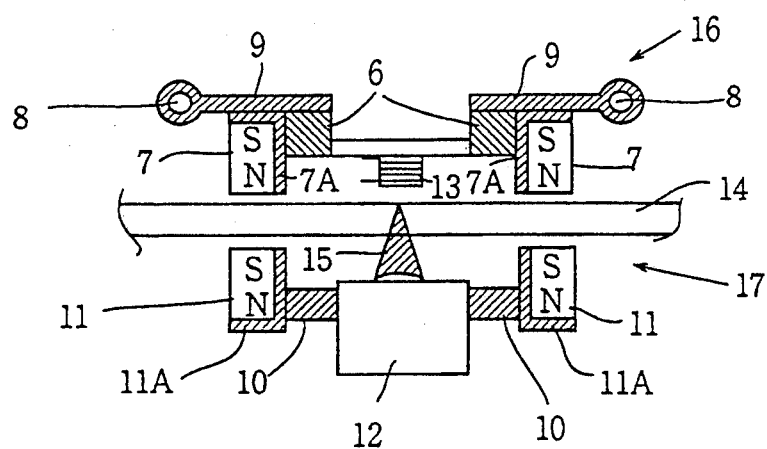
FIGS. 5 and 6 are sectional view of other embodiments of the read-write head of the present invention.

Another means for reducing the size of the player is shown in FIG. 5. A yoke 7A is disposed between each magnet 7 and the supporting member 6, and a yoke 11A is disposed between each magnet 11 and the supporting member 10. The yokes 7A and 11A shield the optical pickup 12, electromagnet 13 and the recording area of the disc 14 against the leakage flux of the magnets 7 and 11. As a result, the distances between the magnets 7 and the magnets 11 may be reduced. Furthermore, a driving coil which is an actuator for moving an objective provided in the optical pickup 12 is protected from the magnetic flux, so that operating system of the pickup such as a track-following servo system is accurately operated.

Figure 6:
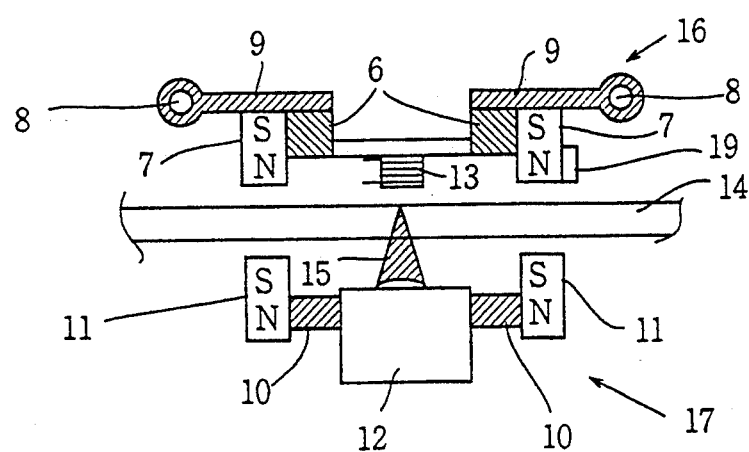

Referring to FIG. 6, another embodiment of the present invention is provided with a magnetic force sensor 19 which is mounted on one of the magnets 7 and 11 to detect magnetic force between the magnets 7 and 11. The magnetic head 16 is connected to a linear motor so as to be moved in the radial direction of the disc 14.

Figure 7:
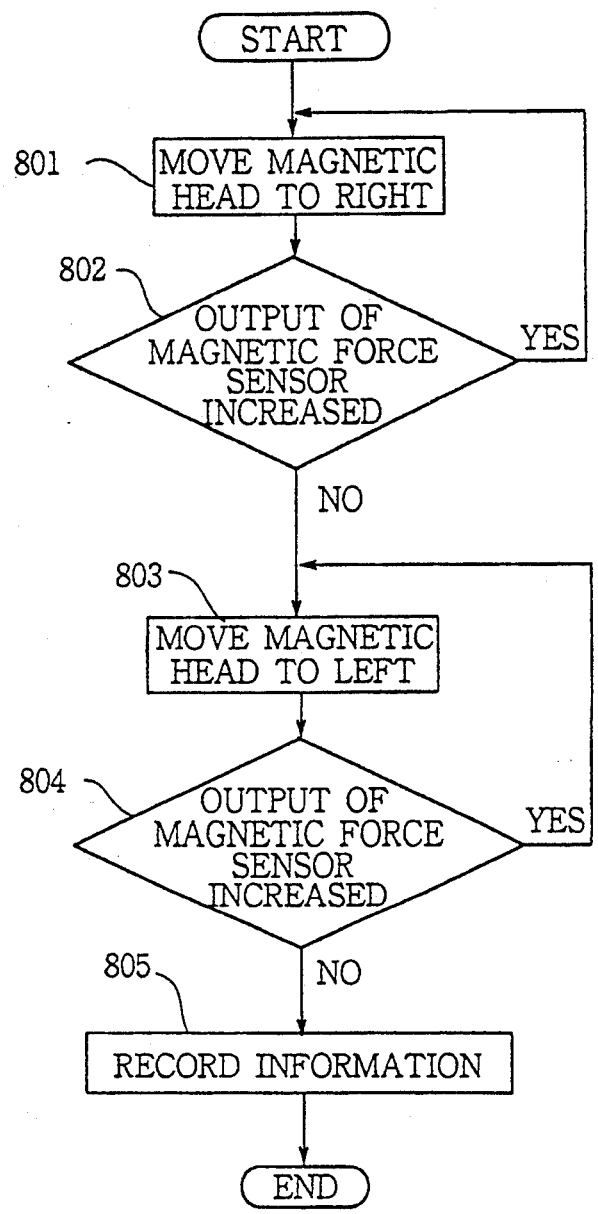
FIGS. 7 is a flowchart for explaining the operation of the read-write head of FIG. 6.

The operation for recording information with the read-write head of the present embodiment is described hereinafter with reference to FIG. 7. At the start of the operation, the optical head 17 is moved to the program area of the disc 14 and the magnetic head 16 follows the optical head 17. The magnetic head 16 is slightly moved to the right at a step 801. It is determined at a step 802 whether the output of the magnetic force sensor 19 increased. When the output increases, the program returns to the step 801, and the magnetic head 16 is further moved to the right. To the contrary, when the magnetic force decreases, the magnetic head 16 is moved to the left at a step 803. Thereafter, the increase of the magnetic force is again checked at the step 802 or at a step 804. In this manner, the magnetic head 16 is positioned at a location where the magnetic force between the magnets 7 and 11 becomes maximum, that is to say, where the electro-magnet 13 most accurately opposes the optical pickup 12. When the optimum position of the magnetic head 16 is obtained, information is recorded at a step 805.

In order to determine that the electromagnet 13 is accurately above the optical pickup 12, the load on the linear motor when moving the pickup 12 may be used.

Figure 8:
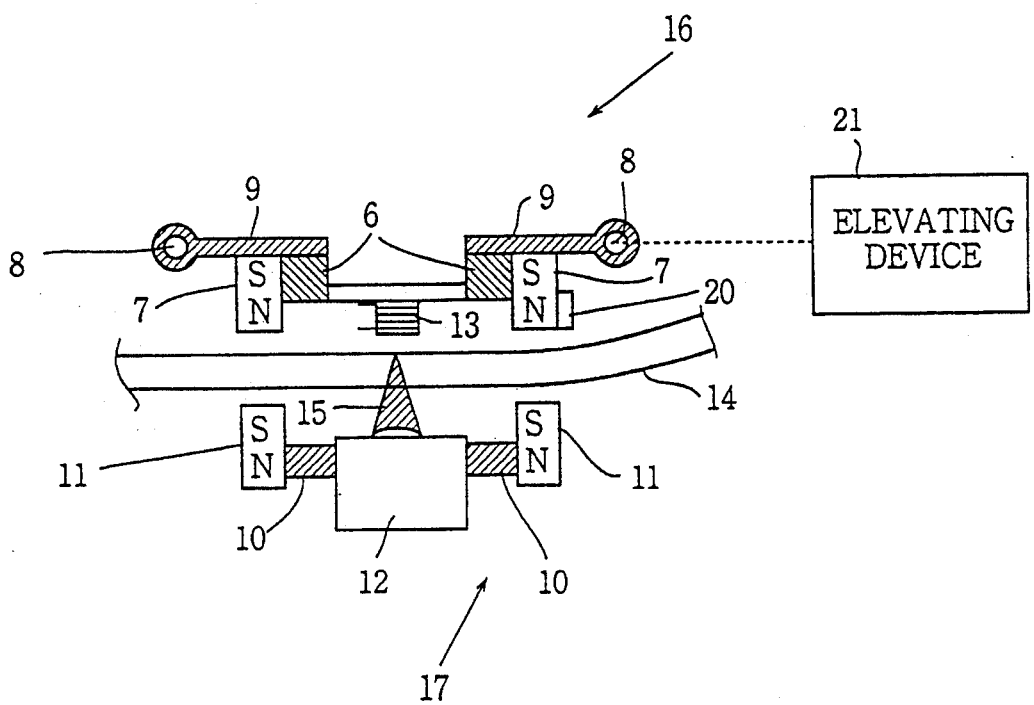
FIG. 8 is a sectional view of another embodiment of the read-write head of the present invention.
Figure 9:
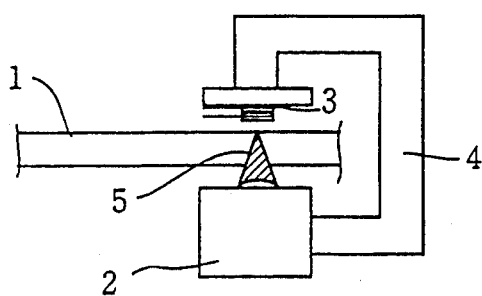
FIG. 9 is a schematic diagram of a conventional read-write head of a magneto-optical disc player.

Another embodiment shown in FIG. 8 has a sensor 20 mounted on one of the magnets 7 for detecting a distance between the magnet 7 and the upper surface of the disc 14. The guide rails 8 are connected to an elevating device 21 so that the magnetic head 16 can be vertically moved. If the disc 14 is warped as shown in the figure, the sensor 20 detects that the distance between the electromagnet 13 and the disc 14 is too small. Accordingly, the magnetic head 16 is raised by the elevating device 21.

Although the present invention has been described relative to a magneto-optical disc player where information is recorded by magnetically modulating the magnetic field on the surface of the discs, the present invention may be applied to an optical disc player using a optical modulation system for recording.

In accordance with the present invention, the upper and lower heads interposing the disc are attracted to each other by magnets. Hence the relative positions of the heads are not affected by deformation and abrasion of elements. Accordingly, information can be accurately recorded. Since the heads are not supported by an integral connecting member, each of the magnetic and optical heads can be independently and hence quickly moved, so that a determined area of the disc can be quickly searched. Moreover, a space taken up by the connecting member of the heads is no longer necessary so that the size of the disc player can be reduced.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A read-write head of a magneto-optical disc player comprising:

an optical head having an optical pickup;

a magnetic head having an electromagnet;

guide means for guiding the optical head and the magnetic head so that each of the heads is independently moved in the radial direction of an optical disc;

attracting means provided on both the heads for attracting each other, whereby one of the heads is moved by the other head when the other head is moved by driving means; and shielding means for shielding elements on the heads.

2. A read-write head according to claim 1, wherein the attracting means is a permanent magnet.

* * * * *